United States Patent
Czaja et al.

(10) Patent No.: US 7,639,649 B2
(45) Date of Patent: *Dec. 29, 2009

(54) METHOD AND APPARATUS FOR INITIATING A REVERSE LINK INTERGENERATIONAL HANDOFF IN A CDMA COMMUNICATION SYSTEM

(75) Inventors: Stanislaw Czaja, Cardiff, CA (US); Kraig Lamar Anderson, San Diego, CA (US); Hong Kui Yang, San Diego, CA (US)

(73) Assignee: VIA Telecom Co., Ltd., San Diego, CA (US)

( * ) Notice: Subject to any disclaimer, the term of this patent is extended or adjusted under 35 U.S.C. 154(b) by 623 days.

This patent is subject to a terminal disclaimer.

(21) Appl. No.: 11/334,764

(22) Filed: Jan. 18, 2006

(65) Prior Publication Data

US 2006/0187869 A1 Aug. 24, 2006

Related U.S. Application Data

(63) Continuation of application No. 09/687,199, filed on Oct. 12, 2000, now Pat. No. 7,023,822.

(60) Provisional application No. 60/159,050, filed on Oct. 12, 1999.

(51) Int. Cl.
*H04B 7/212* (2006.01)
(52) U.S. Cl. ...................... 370/332; 455/437
(58) Field of Classification Search ............ 370/317, 370/318, 320, 328, 329, 331–335, 338; 455/436–443, 455/525, 552.1, 522; 375/225, 130, 224
See application file for complete search history.

(56) References Cited

U.S. PATENT DOCUMENTS

| 4,901,307 A | 2/1990 | Gilhousen et al. |
| 5,487,174 A | 1/1996 | Persson |
| 5,640,414 A | 6/1997 | Blakeney et al. |
| 5,697,055 A | 12/1997 | Gilhousen et al. |
| 5,872,774 A | 2/1999 | Wheatley et al. |

(Continued)

OTHER PUBLICATIONS

Moore, Ian, Office Action received from the USPTO dated Feb. 9, 2004 for U.S. Appl. No. 09/687,199, 19 pgs.

(Continued)

*Primary Examiner*—Ian N Moore
(74) *Attorney, Agent, or Firm*—James W. Huffman

(57) ABSTRACT

A novel method and apparatus for initiating a reverse link intergenerational handoff in a CDMA communication system is disclosed. The inventive reverse link intergenerational handoff initialization method and apparatus measures and compares parameters between a serving base station of one generation and a target base station of another generation to determine the best possible handoff initiation time instant for performing a reverse link intergenerational hard handoff. The method and apparatus can utilize one of several embodiments to determine the best possible handoff initiation time instant. A pilot signal strength embodiment determines a handoff initiation time instant based upon the total pilot signal strength of both a serving and target base station. The $E_b/N_t$ embodiment determines a handoff initiation time instant based upon $E_b/N_t$ (ratio of average power per bit to total received power spectral density) values of both a serving and a target base station. The disclosed method and apparatus decreases the probability of degraded or dropped calls during intergenerational handoffs.

20 Claims, 9 Drawing Sheets

U.S. PATENT DOCUMENTS

| | | | |
|---|---|---|---|
| 5,940,430 | A | 8/1999 | Love et al. |
| 5,999,816 | A | 12/1999 | Tiedemann et al. |
| 6,021,328 | A | 2/2000 | Curtis et al. |
| 6,058,107 | A | 5/2000 | Love et al. |
| 6,181,738 | B1 | 1/2001 | Chheda et al. |
| 6,438,378 | B1 | 8/2002 | Kouno |
| 6,515,975 | B1 | 2/2003 | Chheda et al. |
| 6,606,485 | B1 | 8/2003 | Chen et al. |
| 7,023,822 | B1 * | 4/2006 | Czaja et al. ............... 370/332 |
| 7,072,311 | B1 | 7/2006 | Czaja et al. |
| 2002/0027890 | A1 | 3/2002 | Bernstein et al. |
| 2002/0037726 | A1 | 3/2002 | Czaja et al. |

OTHER PUBLICATIONS

Czaja, et al., Response filed in the USPTO dated May 10, 2004 for U.S. Appl. No. 09/687,199, 20 pgs.

Moore, Ian, Office Action received from the USPTO dated Jul. 23, 2004 for U.S. Appl. No. 09/687,199, 33 pgs.

Czaja, et al., Response to Final Office Action filed in the USPTO dated Oct. 5, 2004 for U.S. Appl. No. 09/687,199, 20 pgs.

Moore, Ian, Advisory Action received from the USPTO dated Oct. 28, 2004 for U.S. Appl. No. 09/687,199, 4 pgs.

Moore, Ian, Interview Summary received from the USPTO dated Dec. 2, 2004 for U.S. Appl. No. 09/687,199, 3 pgs.

Czaja, et al., RCE and Amendment for Request for Continued Examination filed in the USPTO on Jan. 25, 2005 for U.S. Appl. No. 09/687,199, 12 pgs.

Moore, Ian, Office Action received from USPTO dated Mar. 28, 2005 for U.S. Appl. No. 09/687,199, 31 pgs.

Czaja, et al., Amendment filed in the USPTO dated Jun. 28, 2005 for U.S. Appl. No. 09/687,199, 15 pgs.

Czaja, et al., Rule 312 Amendment After Allowance filed in the USPTO dated Oct. 18, 2005 for U.S. Appl. No. 09/687,199, 4 pgs.

Moore, Ian, Notice of Allowance received from the USPTO dated Sep. 26, 2005 for U.S. Appl. No. 09/687,199, 7 pgs.

Moore, Ian, Office Action received from the USPTO dated May 6, 2004 for U.S. Appl. No. 09/687,201, 20 pgs.

Czaja, et al., Amendment filed in the USPTO dated Aug. 6, 2004 for U.S. Appl. No. 09/687,201, 18 pgs.

Moore, Ian, Office Action received from the USPTO dated Sep. 23 2004 for U.S. Appl. No. 09/687,201, 32 pgs.

Czaja, et al., Request for Continued Examination and Amendment filed in the USPTO on Jan. 25, 2005 for U.S. Appl. No. 09/687,201, 12 pgs.

Moore, Ian, Office Action received from the USPTO dated Mar. 16, 2005 for U.S. Appl. No. 09/687,201, 26 pgs.

Czaja, et al., Amendment filed in the USPTO dated Jun. 15, 2005 for U.S. Appl. No. 09/687,201, 12 pgs.

Czaja, et al., Proposed Supplemental Amendment filed in the USPTO dated Dec. 15, 2005 for U.S. Appl. No. 09/687,201, 8 pgs.

Czaja, et al., Supplemental Amendment filed in the USPTO dated Dec. 30, 2005 for U.S. Appl. No. 09/687,201, 9 pgs.

Moore, Ian, Notice of Allowance received from the USPTO dated Feb. 13, 2006 for U.S. Appl. No. 09/687,201, 4 pgs.

U.S. Appl. No. 09/687,201, filed Oct. 12, 2000, Czaja, et al.

U.S. Appl. No. 60/159,050, Anderson, et al., abandoned.

"Upper Layer (Layer 3) Signaling Standard for cdma2000 Spread Spectrum Systems", 3GPP2, C.S0005-0, Version 1.0, Jul. 1999, pp. 1-1 through F-6.

"Mobile Station-Base Station Compatibility Standard for Wideband Spread Spectrum Celluar Systems", TIA/EIA Standard, ANSI/TIA/EIA-95-B-1999, approved Feb. 3, 1999, pp. 1-1 through G-2.

Ramakrishna, D., "On Improving Call Drop Rates in cdma2000", Sep. 21-14, 1999, IEEE, pp. 1353-1357, vol. 3.

* cited by examiner

METHOD AND APPARATUS FOR INITIATING A REVERSE LINK INTERGENERATIONAL HANDOFF IN A CDMA COMMUNICATION SYSTEM

CROSS REFERENCE TO RELATED UTILITY AND PROVISIONAL APPLICATIONS—CLAIM OF PRIORITY UNDER 35 USC SECTIONS 120 AND 119(e)

This application claims the benefit under 35 U.S.C. 120 and is a continuation of U.S. application Ser. No. 09/687,199, filed Oct. 12, 2000, now U.S. Pat. No. 7,023,822 issued Apr. 4, 2006 and entitled "Method and Apparatus for Initiating a Reverse Link Intergenerational Handoff in a CDMA Communication System", which claims the benefit under 35 U.S.C. 119 of U.S. Provisional Application No. 60/159,050, filed Oct. 12, 1999, entitled "Trigger Mechanism Allowing Inter-Generation Handoffs Between Different Generations of CDMA Systems". Both the parent application (U.S. application Ser. No. 09/687,199, filed Oct. 12, 2000) and the related provisional application (U.S. Provisional Application No. 60/159,050, filed Oct. 12, 1999) are incorporated by reference herein in their entirety. This continuation application is related to commonly assigned U.S. application Ser. No. 09/687,201, filed Oct. 12, 2000, now U.S. Pat. No. 7,072,311 issued Jul. 4, 2006 and entitled "Method and Apparatus for Initiating a Reverse Link Intergenerational Handoff in a CDMA Communication System", which claims the benefit under 35 U.S.C. 119 of U.S. Provisional Application No. 60/159,050, filed Oct. 12, 1999.

BACKGROUND

1. Field

The disclosed method and apparatus relate to CDMA communication systems, and more particularly to methods for initiating a reverse link intergenerational handoff in CDMA communication systems.

2. Description of Related Art

As is known, wireless communication systems facilitate two-way communication between a plurality of subscriber mobile radio stations or "mobile stations" and a fixed network infrastructure. Typically, the plurality of mobile stations communicate with the fixed network infrastructure via a plurality of fixed base stations. Exemplary systems include such mobile cellular telephone systems as Code Division Multiple Access (CDMA) systems, Time Division Multiple Access (TDMA) systems, and Frequency Division Multiple Access (FDMA) systems. The objective of these digital wireless communication systems is to provide communication channels on demand between the mobile stations and the base stations in order to connect the mobile station users with the fixed network infrastructure (usually a wired-line system).

Exemplary CDMA Communication System

Mobile stations typically communicate with base stations using a duplexing scheme that allows for the exchange of information in both directions of connection. In most existing communication systems, transmissions from a base station to a mobile station are referred to as "forward link" transmissions. Transmissions from a mobile station to a base station are referred to as "reverse link" transmissions. These CDMA systems are well known in the art. For example, some such system is described in U.S. Pat. No. 4,901,307, issued on Feb. 13, 1990 to Gilhousen et al., which is hereby incorporated by reference for its teachings of CDMA communication systems.

Basic radio system parameters and call processing procedures for exemplary prior art CDMA systems are described in a TIA specification, entitled "Mobile Station-Base Station Compatibility Standard for Dual-Mode Wideband Spread Spectrum Cellular System," TIA/EIA/IS-95-A, published in May 1995 by the Telecommunications Industry Association, and referred to hereafter as "IS-95A". The update and revision to IS-95A and J-STD-008 (PCS specification analogous to IS-95A) is TIA/EIA/IS-95-B, published in March 1999 by the TIA and referred to hereafter as "IS-95B". The IS-95A and IS-95B specifications are jointly known as second generation or "2G" CDMA system specifications. More recently, a third generation or "3G" CDMA system has been described in the TIA specification, entitled "cdma2000 Series", TIA/EIA/IS-2000-A, published March 2000 by the TIA, and referred to hereafter as "IS-2000". The IS-95A, IS-95B and IS-2000 specifications are hereby incorporated by reference for their teachings on CDMA communication systems.

As shown in FIG. 1, a typical CDMA communication system comprises at least one mobile station and a plurality of fixed base stations geographically distributed over the system's service area and controlled by a mobile telecommunications switching office (MTSO) 20. The service area is defined as the geographical area within which a mobile station can remain and yet still communicate (i.e., maintain a valid radio link) with the CDMA communication system. Each base station provides communication services to a fixed area within the service area. The service area is known as the base station's "coverage area". Thus, when a mobile station is within a base station's coverage area the base station is able to provide communication services to the mobile station. A base station that provides service to the mobile is also known as a "serving" base station. The MTSO 20 coordinates all of the switching functions between base stations, mobile stations, and other communications systems (e.g., a Public Service Telephone Network (PSTN) or satellite communication system, or the like).

As is well known, communication between a base station and a mobile station is typically established using a negotiation process initiated upon call origination. The serving base station begins the negotiation process by assigning a selected one of its available forward traffic channels to the mobile station and thus establishes a forward link with the mobile station. The mobile station then establishes a reverse link with the serving base station. Once communication is established between the serving base station and the mobile station, pilot channels emitted by each base station are used by the mobile station to determine the base station coverage area that the mobile station is within and the quality of the link to the base station. Specifically, each base station transmits an unmodulated pilot channel on a predetermined frequency that assists the mobile stations in detecting signals and measuring signal strengths of nearby base stations.

In typical CDMA systems, a mobile station maintains a list of available base stations for providing communication services to the mobile station. Normally, the mobile station communicates with a base station that has the strongest signal. The mobile station receives the pilot signals and determines which pilot signals are the strongest. A "searcher" unit in the mobile station commonly performs the signal detection and strength measurement functions.

The results from the searcher are reported to the current (i.e., active) base station. The base station then instructs the mobile station to update a list of available base stations maintained by the mobile station. The list is sub-divided into three operative sets—an active set, a candidate set, and a neighbor set. The active set contains a list of the base stations with which the mobile station is currently communicating (typically 1-4 base stations). The candidate set is a list of base stations that may move into the active set. Finally, the neighbor set is a list of base stations which are being monitored, but less frequently.

As the mobile station moves and its currently active base station signal weakens, the mobile station must access a new base station. Based upon the results of the searcher, and based upon the instructions received back from the base station, the mobile station will update its sets, and communicate with a different base station. In order for communication transmissions to appear seamless to the mobile station user, the communication link must be "handed off" to the next base station. A "handoff" occurs when a mobile station moves across a "boundary line" from a first serving base station's coverage area to a second base station's coverage area. The communication system "hands off" service from the first serving base station to the second base station, also known as the "target" base station. A handoff also occurs when a single base station utilizes multiple frequency channels and switches communication between frequency channels. Each pilot channel is identified by a pseudorandom noise (PN) sequence offset and/or a frequency assignment. Thus, each pilot channel is uniquely identified with a base station that transmits the pilot channel. Pilot channels aid mobile stations in performing handoffs.

FIG. 1 depicts a simple CDMA communication system having a service area comprising seven base stations controlled by one MTSO 20. Each base station services a separate coverage area, represented by a hexagon in FIG. 1, and communicates using a specific frequency, frequency one. ($F_1$) or frequency two ($F_2$). Typically, $F_1$ and $F_2$ operate either on the Cellular band (800 MHz) or the PCS band (1900 MHz). For example, a first base station 12, located in the middle of a Service Coverage Area One, communicates on a first frequency $F_1$. A mobile station 10 is serviced by the first base station 12 because it is located within the Coverage Area One. When the mobile station 10 moves from the Coverage Area One to a Coverage Area Two, it performs a handoff procedure from the first base station 12, the serving base station, to a second base station 14, the target base station. Thus, the mobile station 10' (of FIG. 1) is now serviced by the second base station 14. It is critical for the MTSO to determine the appropriate time to initiate a handoff to a frequency that differs from the serving frequency in order to maintain communication with the mobile station during a call.

In CDMA systems, there are two basic types of handoffs, so-called "hard handoffs" (HHO) and "soft handoffs" (SHO). A "soft handoff" or "Make-Before-Break" is a handoff procedure in which the mobile station commences communications with a target base station without interrupting communications with the serving base station. Because mobile stations typically contain only one radio frequency (RF) chain, soft handoffs can only be used between base stations with CDMA Channels having identical frequency assignments. Referring again to FIG. 1, a soft handoff procedure can be performed when the mobile station 10 travels from a first Coverage Area One to a third Coverage Area Three because the base station 12 and a third base station 16 have identical frequency assignments, $F_1$.

A "hard handoff" is defined as a handoff in which a mobile station commences communication with a target base station after a momentary interruption in communication with a serving base station. Hard handoffs are also referred to as "Break-Before-Make" handoffs. A hard handoff is used when the serving base stations and the target base stations have differing CDMA channel frequency assignments. A hard handoff can also occur when a single base station utilizes multiple frequency channels and switches communication between frequency channels. For example, a single base station hard handoff can occur between sectors associated with the single base station. The present disclosed method and apparatus generally addresses a multiple base station scenario, and thus, the single base station scenario is not described in detail herein. However, one skilled in the art shall recognize that the present disclosed method and apparatus can be utilized equally as well in a single base station scenario.

During a hard handoff, the radio link is momentarily interrupted because a typical mobile station contains only one RF chain and therefore can only demodulate one frequency at a time. Thus, switching from the CDMA channels of the serving base station frequency to the CDMA channels of the target base station frequency produces a momentary interruption in the continuity of the radio link with the CDMA communication system. This momentary interruption can result in a "dropped" or lost call. As shown in FIG. 1, the first base station 12 is assigned a first frequency $F_1$ and the second base station 14 is assigned a second frequency $F_2$. A hard handoff is performed when the mobile station 10 travels from the Coverage Area One to the Coverage Area Two because the first base station 12 and the second base station 14 operate on different frequencies, $F_1$ and $F_2$.

Handoffs performed within a CDMA system having base stations belonging to different generation CDMA systems (e.g., within an intergenerational CDMA system having both 2G CDMA systems and 3G CDMA systems) are known as intergenerational handoffs (IGHO). An exemplary intergenerational CDMA system and IGHO is described in more detail below with reference to FIG. 4. An IGHO can be a soft handoff or a hard handoff depending upon system factors described further below with reference to disadvantages of current methods of performing a reverse link intergenerational HHO in a CDMA communication system. 3G CDMA systems have been designed to provide backward compatibility with 2G CDMA systems at the signaling and call processing levels. However, 2G and 3G CDMA systems are not naturally compatible at the physical layer because these systems employ different modulation schemes and spreading rates. Thus, due to this physical layer incompatibility between 2G and 3G CDMA systems, problems can occur when performing IGHOs. For example, a "complete" Intergenerational Soft Handoff (IGSHO) (i.e., a soft handoff on both the forward link and the reverse link) is presently not possible.

Intergenerational CDMA systems (e.g., CDMA systems comprising both 2G and 3G CDMA systems) can perform forward link IGSHOs because mobile stations typically comprise "rake" receivers that are capable of demodulating multiple signals concurrently. Thus, a typical mobile station can simultaneously demodulate a signal from a 2G serving base station and a signal from a 3G target base station. Rake receivers and simultaneous demodulation techniques are well known in the CDMA art and thus are not described in detail herein. However, reverse link IGSHOs are not practical due to the difference in modulation and coding parameters for the different generations. Therefore, at the service boundaries between the 2G and 3G systems, a reverse link intergenerational hard handoff (IGHHO) has been proposed.

In this type of hard handoff, the connection with a currently active base station (e.g., a 2G base station) is terminated before a new service with a new base station (e.g., a 3G base station) is established. This type of service disruption lowers the quality of service (QoS) provided to the cellular telephone user. In this scenario, if the mobile station is engaged in a voice service, the user will most likely experience voice quality degradation or even a "dropped" or lost call. If the mobile station is transferring data, significant transmission delays (due to retransmission errors) will likely occur.

An important objective of CDMA communications is to reduce the probability of dropping a call during handoff procedures. As the communication system increases its accuracy of detecting the coverage boundaries between base stations, the probability of dropping a call is reduced. Thus, industry technical specifications (e.g., IS-2000) and methods have been developed to increase the accuracy of determining the best possible "handoff initiation time instant". A handoff initiation time instant is defined herein as a moment in time when a CDMA system initiates a mobile station handoff. A mobile station performing a handoff between different generation base stations (e.g., a 2G serving base station and a 3G target base station) is susceptible to dropped calls because a reverse link IGHHO must be performed.

One method that attempts to determine the best possible handoff initiation time instant during a reverse link IGHHO utilizes pilot signal strengths ($E_c/I_o$) and frame counters. In accordance with this method, a mobile station's searcher unit determines pilot signal strengths as described above. Pilots having $E_c/I_o$ values above a predetermined threshold (e.g., T_Add) are included in the mobile station's active set. CDMA communication systems transmit values such as T_Add using methods well known to one skilled in the CDMA communication art. When a base station is added to a mobile station's active set, the mobile station utilizes a rake receiver to simultaneously demodulate both base station signals from the 2G and 3G CDMA systems. After decoding a first "good" frame from a target base station when the target base station's $E_c/I_o$ value is above a predetermined threshold (e.g., "CT_Drop") the mobile station initiates a frame counter. One skilled in the communication art shall recognize that a good frame is a frame having sufficient quality. The frame counter records the number of good frames received from the target base station. Upon the expiration of the frame counter a message is sent to the serving base station and the system performs a reverse link IGHHO.

FIG. 2 shows an exemplary graph depicting the above-described method of performing a reverse link IGHHO. The graph shown in FIG. 2 depicts the received pilot signal strength of a serving base station and a target base station (as measured by a mobile station) during a handoff. As shown in FIG. 2 at a time reference point A, the target base station's $E_c/I_o$ equals a pre-defined threshold "T_Add". At T_Add, the target base station's pilot is added to the mobile station's active set and the rake receiver begins to demodulate the target base station's signal. At a time reference point B the mobile station receives a good frame from the target base station and a frame counter begins counting a predetermined number of frames. At a time reference point C the frame counter expires and a reverse link IGHHO is performed. The exemplary reverse link IGHHO of FIG. 2 is successful because the hard handoff is performed while both the serving base station and the target base station are above T_Add (the threshold for satisfactory communication between a mobile station and a base station).

Disadvantageously, the above-described method is susceptible to dropped calls because a frame counter is used to initiate the reverse link IGHHO. Use of a frame counter can cause the reverse link IGHHO to occur after the call is dropped. FIG. 3 shows one such example. FIG. 3 shows an exemplary graph depicting a disadvantage of the above-described method of performing a reverse link IGHHO. The graph shown in FIG. 3 is substantially similar to the graph shown in FIG. 2. At a time reference point A' the target base station is added to the mobile station's active set and the rake receiver begins to demodulate the target base station's signal. At a time reference point B' the mobile station receives a good frame from the target base station and a frame counter begins counting a predetermined number of frames. At a time reference point C' the frame counter expires and a reverse link IGHHO is performed. As shown in FIG. 3, the $E_c/I_o$ of the serving base station fell below T_Add at the time reference point C'. Thus, the exemplary reverse link IGHHO of FIG. 3 is unsuccessful and a dropped call occurred because the mobile station lost the signal from the serving base station before initiating the reverse link IGHHO.

A disadvantage of the above-described method of performing a reverse link IGHHO in a CDMA communication system is that factors other than the signal strength ($E_c/I_o$) affect the handoffs. For example, factors such as modulation schemes, coding gains, rate of forward link power control and coherent/non-coherent demodulation affect handoff procedures. Thus, the prior art methods of utilizing timers to determine handoff initiation time instants are susceptible to increased dropped calls or reduced voice quality. Thus, it is desirable to provide a method and apparatus for initiating mobile station handoffs between at least two different generations of CDMA systems to avoid the disadvantages associated with the prior art reverse link intergenerational hard handoff schemes. The present continuation application discloses such a method and apparatus for initiating a reverse link intergenerational handoff in a CDMA communication system.

SUMMARY

The present disclosure teaches a novel method and apparatus for initiating a reverse link intergenerational handoff in a CDMA communication system. The reverse link intergenerational handoff initialization method and apparatus of the present application measures and compares parameters of a serving base station of one generation and a target base station of another generation to determine the best possible handoff initiation time instant for performing a reverse link intergenerational hard handoff. In a preferred embodiment, a mobile station autonomously (i.e., without system intervention from an MTSO or base stations) initiates and performs all handoffs (i.e., IGSHO and IGHHO). The present disclosed method and apparatus can utilize one of several embodiments to determine the best possible handoff initiation time instant.

In one embodiment of the present disclosure, a pilot signal strength approach is used to determine a handoff initiation time instant based upon the total pilot signal strength of both a serving base station and a target base station. Specifically, the method of this embodiment initiates a reverse link intergenerational handoff when the pilot signal strength of the serving base station equals the pilot signal strength of the target base station.

In another embodiment, a measurement of $E_b/N_t$ is used. This technique determines a handoff initiation time instant based upon $E_b/N_t$ (ratio of average power per bit to total received power spectral density) values of both a serving base station and a target base station. Specifically, the method initiates a reverse link intergenerational handoff when the $E_b/E_t$ of the serving base station equals the sum of the $E_b/N_t$ of the target base station and an offset. The offset is specified in terms of generation modulation efficiency. In one exemplary embodiment, an offset is equal to the difference between a serving base station's $E_b/N_t$ requirements and a target base station's $E_b/N_t$ requirements. In a preferred embodiment, the offset is utilized to achieve a desired frame error rate (FER) or quality of service (QoS).

The method and apparatus of the present disclosure decreases the probability of degrading and dropping a call during an intergenerational handoff. Specifically, the present disclosed method and apparatus decreases the probability of degrading and dropping a call during a reverse link intergenerational hard handoff. The present method and apparatus achieves this decrease in the probability of degrading or dropping calls without noticeably degrading voice quality or quality of service (QoS).

The present method and apparatus can be used in any intergenerational handoff (IGHO), soft or hard. One skilled in the art shall recognize that an intergenerational soft handoff (IGSHO) comprises a forward link soft handoff and a reverse link hard handoff, while an intergenerational hard handoff (IGHHO) comprises a forward link hard handoff and a reverse link hard handoff. Although the present method and apparatus is described in the context of a reverse link hard handoff, one skilled in the communication art shall recognize that the present method and apparatus can be used in either an IGSHO or an IGHHO because both types of handoffs utilize a reverse link hard handoff.

The reverse link intergenerational handoff initiation method and apparatus of the present disclosure can either be performed utilizing pilot signal strength or $E_b/N_t$ parameters. In the pilot signal strength embodiment, the method and apparatus determines a handoff initiation time instant based on the serving and target base station's pilot signal strengths. In the $E_b/N_t$ embodiment, the present method and apparatus determines a handoff initiation time instant based on the serving and target base station's $E_b/N_t$ values and an offset. In another embodiment, the pilot signal strength and $E_b/E_t$ embodiments are both calculated and compared to determine a handoff initiation time instant.

The details of the various embodiments of the present method and apparatus are set forth in the accompanying drawings and the description below. Once the details of the method and apparatus are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION

Figure 1:
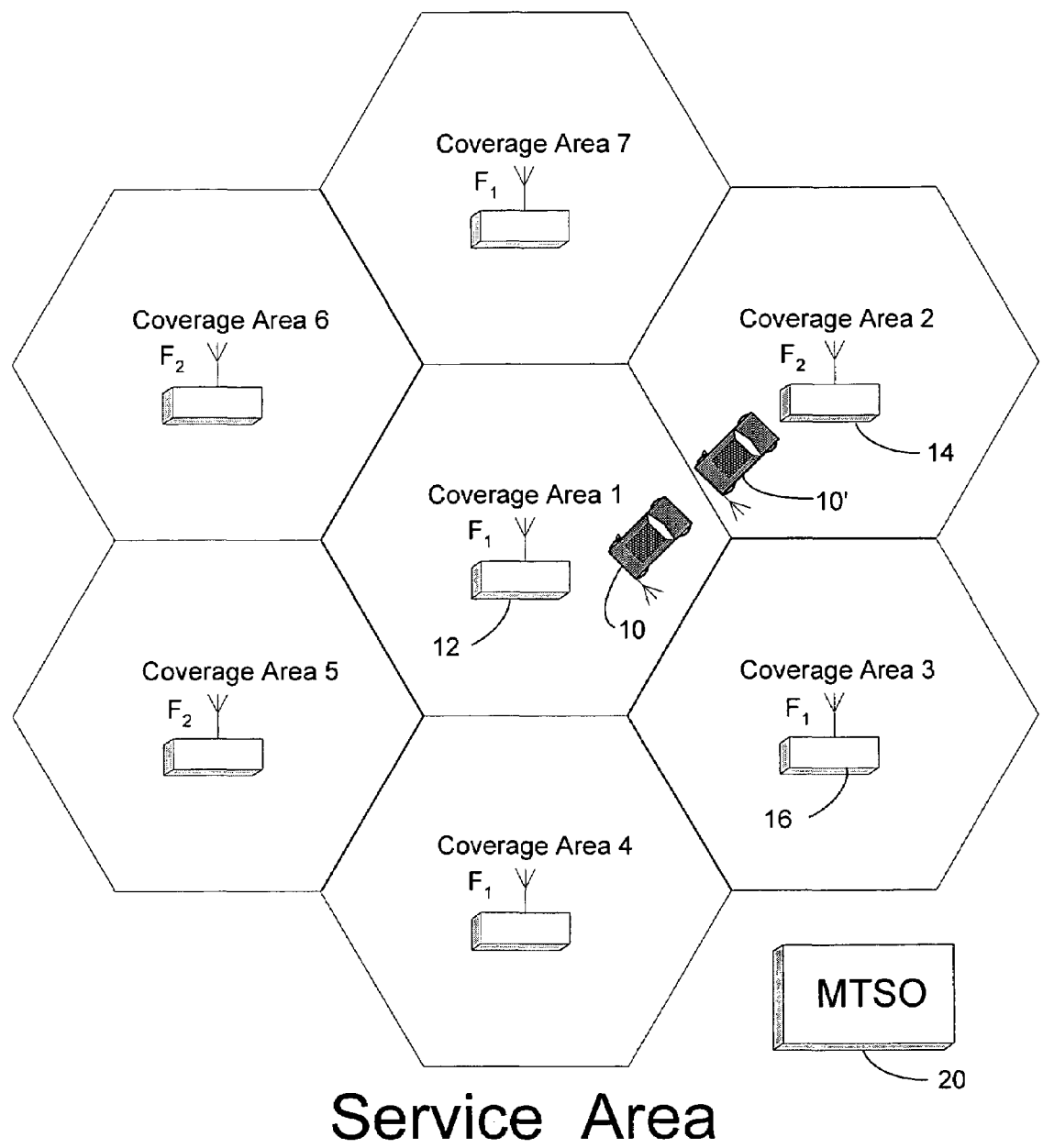
FIG. 1 shows an exemplary CDMA communication system that can be adapted for use by the present reverse link intergenerational handoff method and apparatus.
Figure 2:
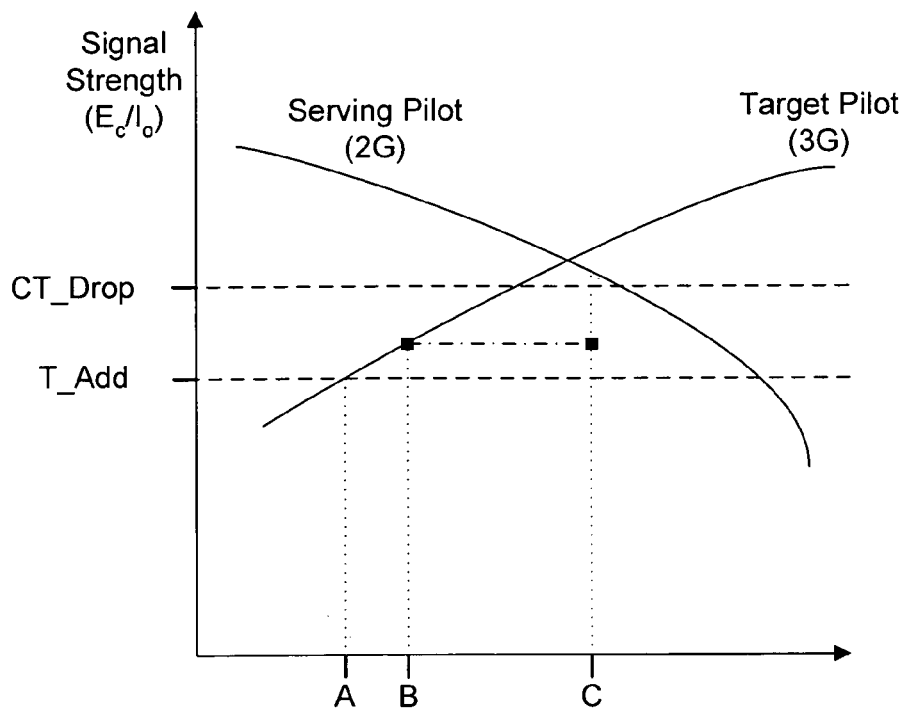
FIG. 2 is a graph depicting an exemplary method of performing a reverse link IGHHO.
Figure 3:
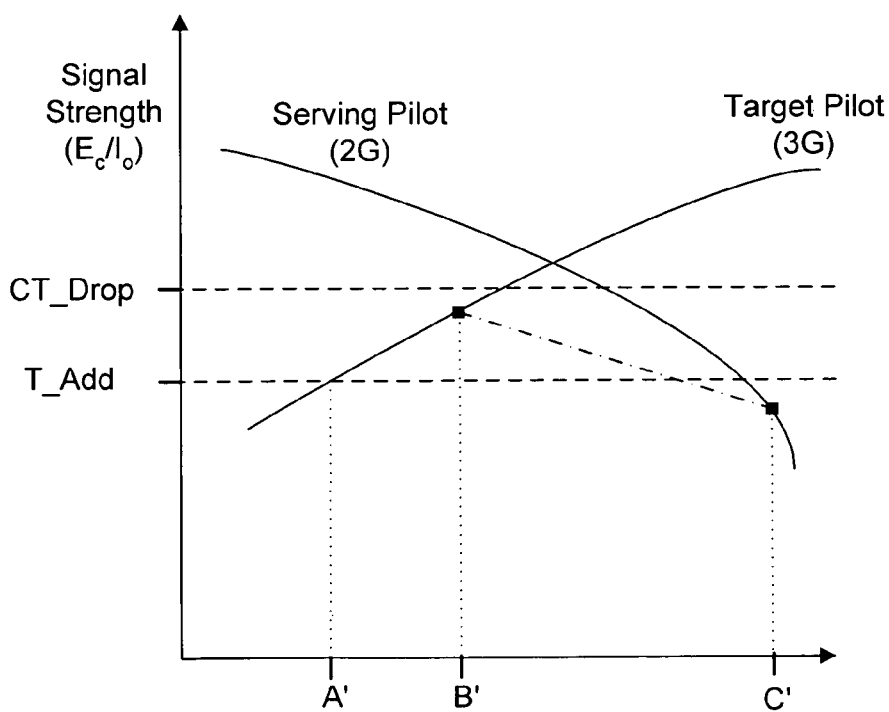
FIG. 3 is a graph depicting an exemplary method of performing a reverse link IGHHO.

Throughout this description, the preferred embodiment and examples shown should be considered as exemplars, rather than as limitations on the present invention.

The disclosed method and apparatus decreases the probability of degrading and dropping calls during intergenerational handoffs (i.e., intergenerational handoffs in both the forward and reverse links). Specifically, the present method and apparatus decreases the probability of degrading and dropping calls during reverse link intergenerational hard handoffs. One skilled in the art shall recognize that the present method and apparatus can be used with either forward link hard handoffs or forward link soft handoffs without departing from the spirit or scope of the present method and apparatus. The present method and apparatus achieves this decrease in the probability of degrading or dropping calls without noticeably degrading voice quality or quality of service (QoS).

The present method and apparatus can be used in any intergenerational handoff (IGHO), soft or hard. One skilled in the art shall recognize that an intergenerational soft handoff (IGSHO) comprises a forward link soft handoff and a reverse link hard handoff. It is important to note that an IGSHO differs from a "complete IGSHO" because a complete IGSHO comprises a forward link soft handoff and a reverse link soft handoff. An intergenerational hard handoff (IGHHO) comprises a forward link hard handoff and a reverse link hard handoff. Although the present method and apparatus is described in the context of a reverse link hard handoff, one skilled in the communication art shall recognize that the present method and apparatus can be used in either an IGSHO or an IGHHO because both types of handoffs utilize a reverse link hard handoff.

One important aspect of the disclosed reverse link intergenerational hard handoff initialization method and apparatus is the ability to determine the best possible time instant for initiating a reverse link intergenerational hard handoff. The disclosed handoff method and apparatus achieves this function using an inventive parameter measurement and comparison process. The disclosed handoff initiation method and apparatus measures and compares parameters between a serving base station of one CDMA generation and a target base station of another CDMA generation.

Several embodiments of the present method and apparatus are described. For example, two exemplary methods for initiating a reverse link intergenerational hard handoff are presented below. These two methods can be independently executed within a CDMA communication system to reduce the probability of degrading or dropping calls. The choice of which method to use in a given system will depend upon the system requirements and available resources within a given CDMA communication system. Alternatively, both methods can be used concurrently by a given CDMA communication system in order to verify the results generated by each method, thus providing an improved system for reverse link hard handoff initiation having redundancy.

The present inventive method and apparatus is primarily intended for use in CDMA communication systems. An exemplary CDMA communication system adapted for use in the present reverse link IGHHO method and apparatus is described herein. However, any convenient wireless communication system can be used provided the mobile station is capable of measuring radio frequency signal strengths and input powers.

The present method and apparatus can be used in any wireless communication system where a goal of decreasing probability of dropped calls and an improvement in service during intergenerational handoffs is desirable. It should be obvious to one skilled in the wireless communication art that either method of performing a forward link handoff (i.e., hard or soft handoff) may be used without departing from the scope of the disclosed method and apparatus.

An Exemplary CDMA Communication System Adapted for Use with the Present Reverse Link Handoff Initiation Method and Apparatus The present inventive method and apparatus is primarily intended for use in CDMA communication systems. However, the description of the CDMA system is not intended to be a limitation of the method and apparatus as the method and apparatus can be used in any wireless communication system that requires the use of hard handoffs. FIG. 1 shows an exemplary CDMA communication system. As shown in FIG. 1, the exemplary CDMA communication system comprises a mobile station 10 and a mobile telecommunications switching office (MTSO) 20. The MTSO 20 controls the operation of a plurality of base stations 12, 14, 16, etc. One exemplary prior art CDMA communication system is described in more detail in the incorporated U.S. Pat. No. 4,901,307. Any other convenient wireless communication system can be used to practice the present method and apparatus provided that the mobile stations are capable of measuring frequency signal strength and input power.

As described above with reference to FIG. 1, a handoff procedure occurs when a base station 12 determines that a mobile station 10 is crossing the boundary from one coverage area to another. The base station 12 and the mobile station 10 measure the received signal strength and input power of pilot channels to determine base station boundaries and coverage areas. When the base station 12 erroneously determines that the mobile station 10 is crossing a base station boundary, a handoff is often initiated either too early or too late resulting in an increase of dropped calls. The present method and apparatus increases the probability of successfully completing hard handoffs without perceptibly compromising voice quality.

Figure 4:
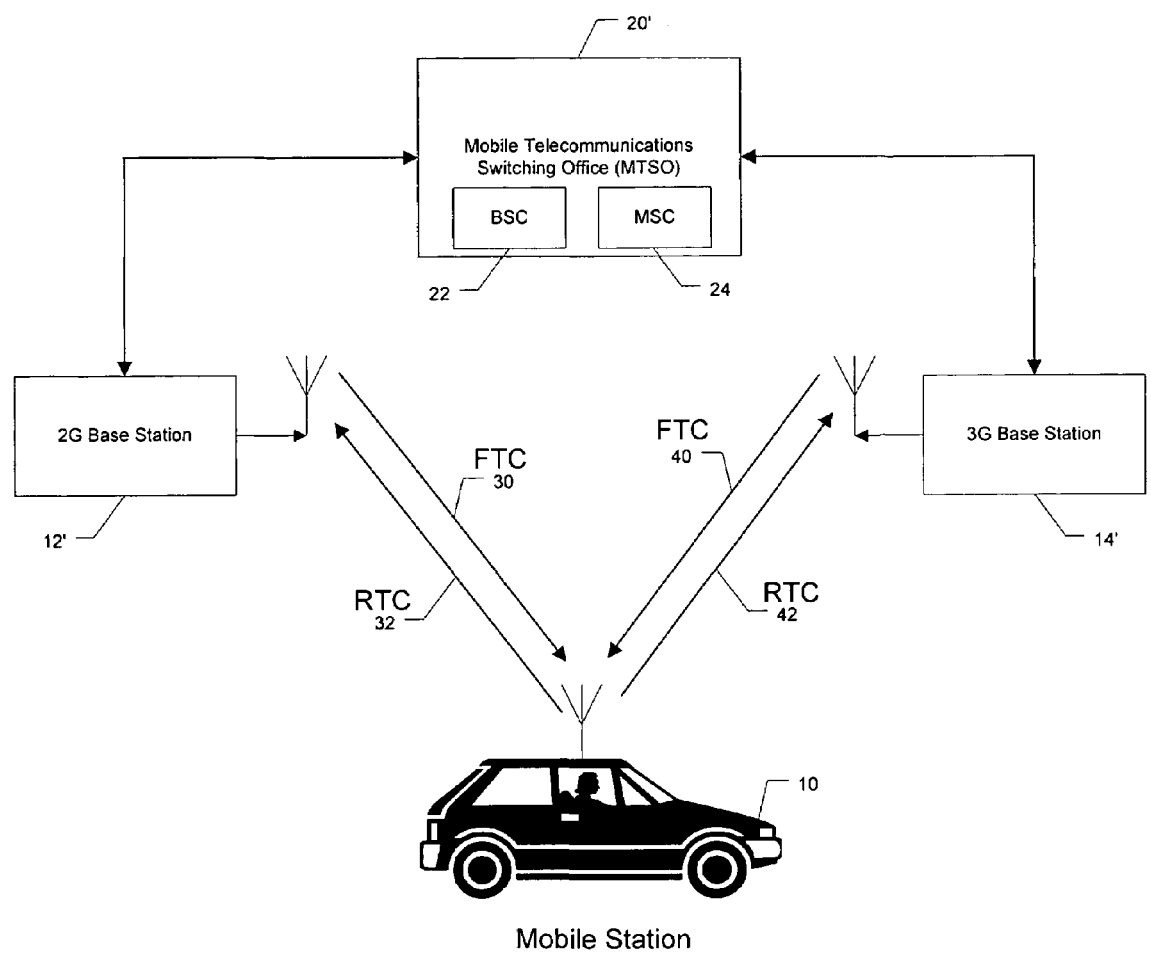
FIG. 4 shows a simplified block diagram of an exemplary intergenerational CDMA communication system adapted for use with the present method and apparatus.

FIG. 4 shows an exemplary intergenerational CDMA communication system adapted for use with the disclosed method and apparatus. As shown in FIG. 4, the mobile station 10 is disposed in an automobile. However, this is not meant to be a limitation to the disclosed method and apparatus and the mobile station 10 may also be disposed within a handheld unit, headset unit, or any such mobile station configuration that is well known in the art. Referring again to FIG. 4, the mobile station 10 communicates with a first base station 12' or a second base station 14' depending on which base station is the "serving" base station. As shown in FIG. 4, the first base station 12' conforms with a second generation CDMA system specification, or "2G". The second base station 14' conforms with a third generation CDMA system specification, or "3G". The mobile station 10 receives and transmits data to its serving base station using a radio communications link. When the 2G base station 12' is the serving base station, the mobile station 10 receives data via a forward traffic channel (FTC) 30 and transmits data via a reverse traffic channel (RTC) 32. When the 3G base station 14' is the serving base station, the mobile station 10 receives data via a forward traffic channel (FTC) 40 and transmits data via a reverse traffic channel (RTC) 42. A mobile telecommunications switching office (MTSO) 20' controls the mobile station 10 the 2G base station 12', and the 3G base station 14'. The MTSO 20' comprises a base station controller (BSC) 22 subsystem and a mobile station controller (MSC) 24 subsystem. The BSC 22 controls all base stations associated with the MTSO 20'. Similarly, the MSC 24 controls all mobile stations associated with the MTSO 20'. An exemplary Intergenerational Handoff (IGSHO) is now described.

During an IGSHO an intergenerational CDMA system performs a forward link IGSHO and a reverse link IGHHO. As described above, rake receivers facilitate the occurrence of forward link IGSHOs. Referring again to FIG. 4, the mobile station 10 communicates with its serving base station, for example, the 2G base station 12'. Thus, a radio link comprising the FTC 30 and the RTC 32 is established. The BSC 22 and MSC 24 subsystems of the MTSO 20' aid in determining the handoff initiation time instant of the intergenerational CDMA system. The MSC 24 communicates with mobile stations through the FTC of the serving base station. In the exemplary intergenerational CDMA communication system, the mobile station 10 autonomously (i.e., without system intervention from an MTSO or base stations) initiates and performs all handoffs (i.e., IGSHO and IGHHO).

When the mobile station 10 approaches a target base station, for example, the 3G base station 14', the mobile station 10 autonomously initiates a forward link IGSHO. Thus, the mobile station 10 simultaneously demodulates the FTC 30 of the serving 2G base station 12' and the FTC 40 of the target 3G base station 14'. As described above, an IGHHO must occur on the reverse link because a typical mobile station can transmit a signal for only one generation at a time. When the mobile station 10 initiates a reverse link IGHHO, the mobile station 10 must sever the RTC 32 with the serving 2G base station 12' before it establishes the RTC 42 with the target 3G base station 14'. A reverse link IGHHO performed at an optimal handoff initiation time instant results in a high probability of a successful reverse link hard handoff. However, a reverse link IGHHO performed too early or too late will result in voice quality degradation or dropped calls. The present disclosed method and apparatus increases the probability of performing a reverse link IGHHO at the proper time instant. The disclosed handoff initiation method and apparatus uses an inventive parameter measurement and comparison process. Two embodiments of the present disclosed method and apparatus are now described.

Pilot Signal Strength ($E_c/I_o$) Embodiment

The pilot signal strength embodiment of the present disclosed method and apparatus determines the proper time to perform a handoff initiation based upon the total pilot signal strength of both a serving base station and a target base station. Specifically, the method initiates a reverse link intergenerational handoff when the pilot signal strength of the serving base station equals the pilot signal strength of the target base station.

Figure 5:
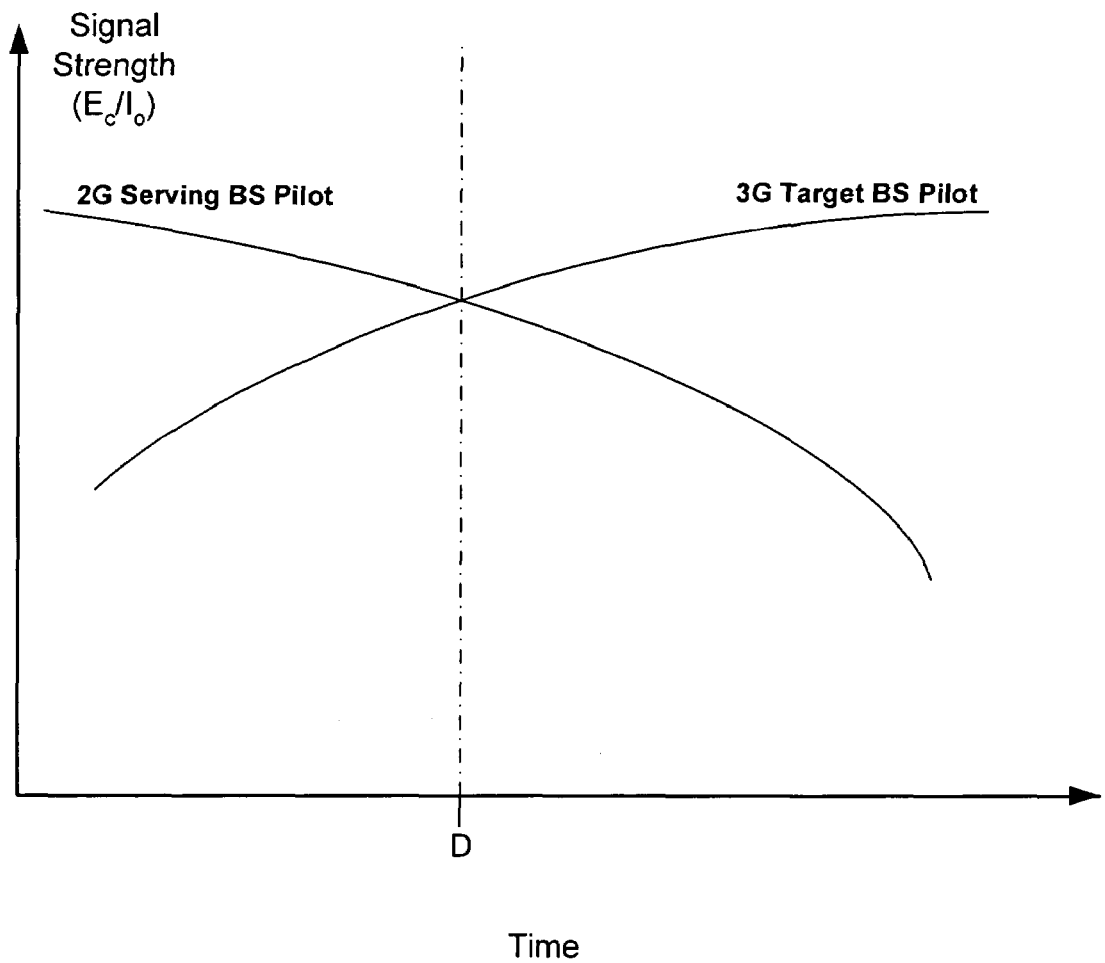
FIG. 5 is a graph depicting pilot signal strengths of a serving base station and a target base station during a handoff.

FIG. 5 shows an exemplary graph depicting pilot signal strengths of a serving base station and a target base station during a handoff. In the exemplary graph of FIG. 5, the serving base station is a 2G base station and the target base station is a 3G base station. The base station generation designations are exemplary only as one skilled in the art shall recognize that the present disclosed method and apparatus works equally well with any intergenerational base station configuration. For example, a configuration comprising a 3G serving base station and a 2G target base station can be used. In another example, a configuration comprising a 1G serving base station and a 3G target base station can be used. As shown in FIG. 5, a time reference point D is the preferred handoff initiation time instant as determined by the pilot signal strength method of the present disclosed method and apparatus. An exemplary pilot signal strength method of the present disclosed method and apparatus is now described.

Figure 6A:
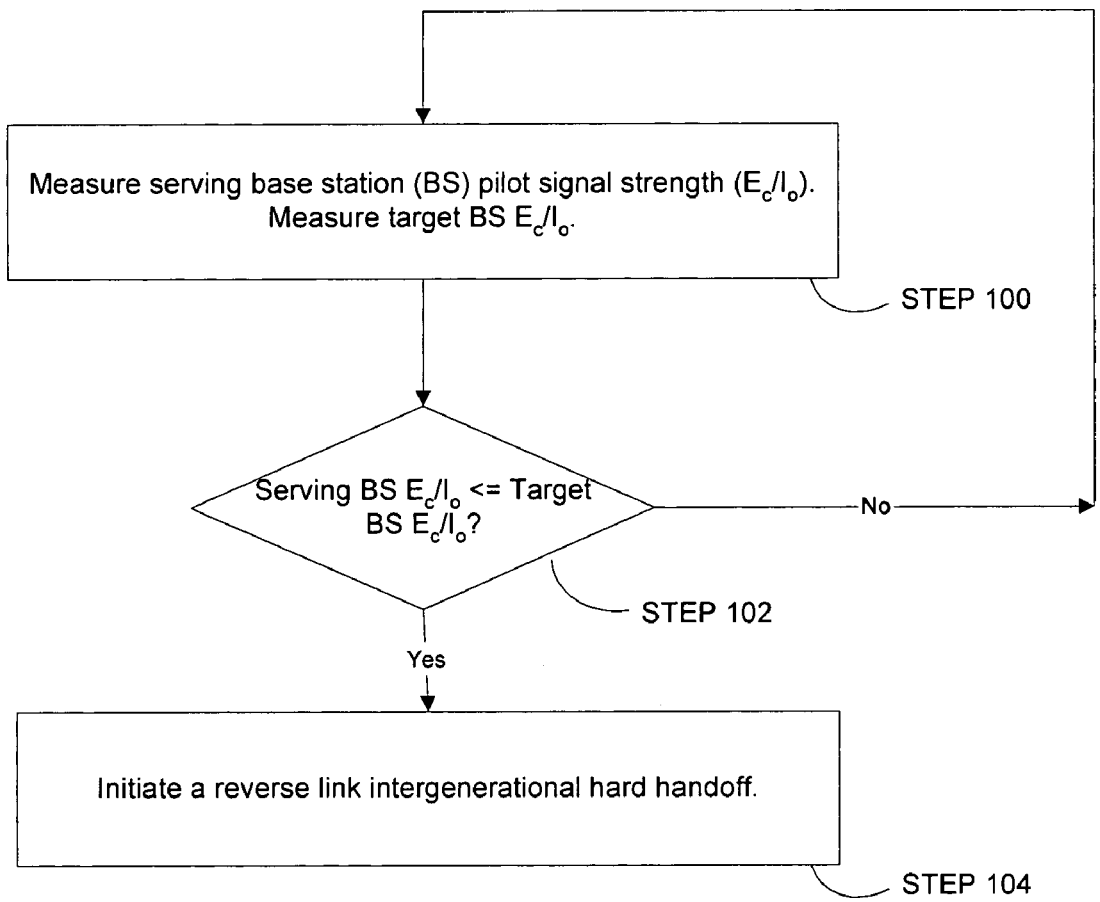
FIG. 6*a* is a logic flowchart of an exemplary pilot signal strength method.

FIG. 6a shows a flowchart of an exemplary pilot signal strength method of the present disclosed method and apparatus. As shown in FIG. 6a, the exemplary pilot signal strength method begins at a STEP 100 where the method measures the pilot signal strength ($E_c/I_o$) of the serving and target base stations. The present method and apparatus then proceeds to a decision STEP 102 where the method determines whether the serving base station (BS) pilot signal strength is less than or equal to the target BS pilot signal strength. If the serving BS $E_c/I_o$ is less than or equal to the target BS $E_c/I_o$, then the method proceeds to a STEP 104. Otherwise, the method returns to the STEP 100. At the STEP 104, the method initiates a reverse link IGHO. An exemplary pilot signal strength method adapted for use in a 2G/3G intergenerational CDMA system is now described with reference to FIG. 6b.

Figure 6B:
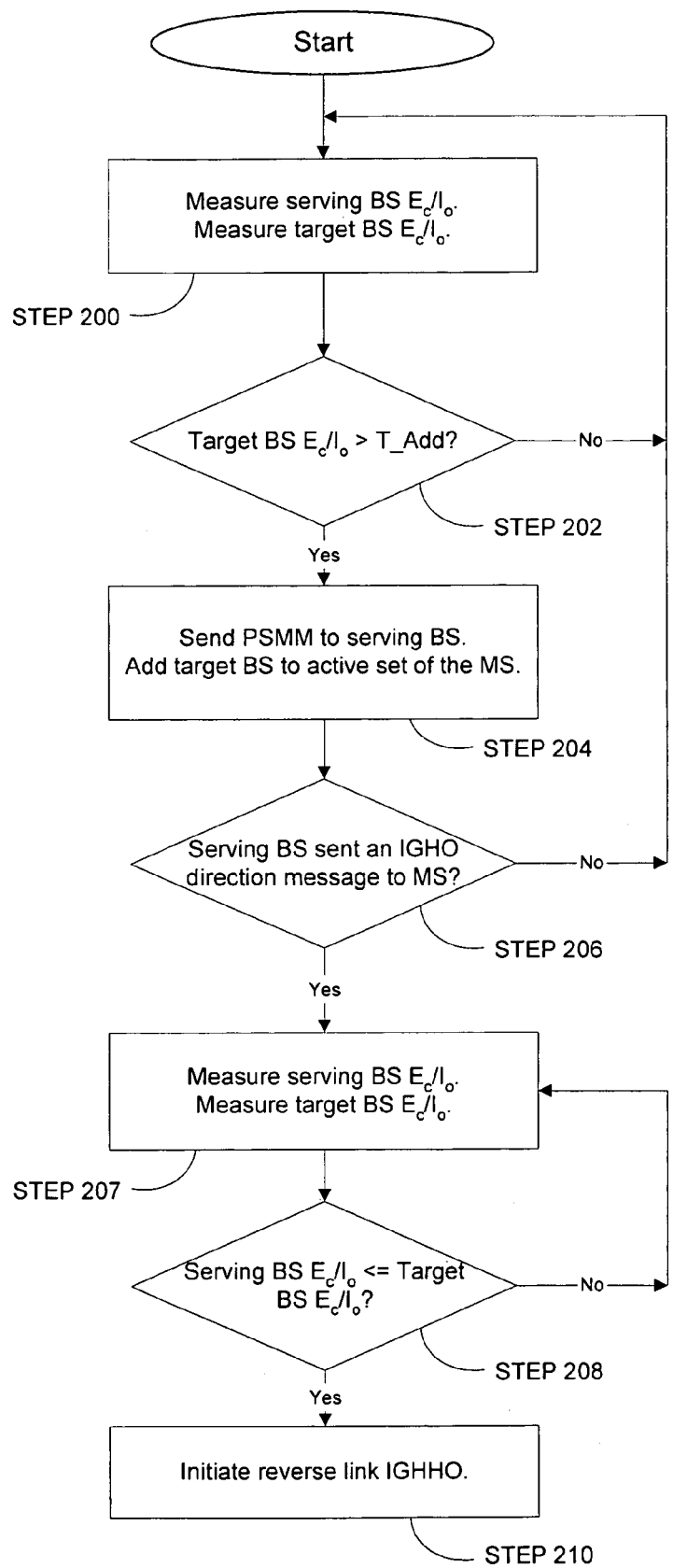
FIG. 6*b* is a logic flowchart of an exemplary pilot signal strength method adapted for use in a 2G/3G intergenerational CDMA system.

FIG. 6b shows a flowchart of an exemplary handoff initiation method of the present disclosed method and apparatus using pilot signal strength data and adapted for use in a 2G/3G intergenerational CDMA system. As shown in FIG. 6b, the exemplary 2G/3G pilot signal strength method begins at a STEP 200 where the method measures the pilot signal strength of the serving and target base stations. The method then proceeds to a decision STEP 202 where the method determines whether the target BS pilot signal strength is greater than a predetermined threshold value ("T_Add"). CDMA communication systems transmit threshold values such as T_Add using methods that are well known to those skilled in the CDMA communication arts. As described above, mobile stations add a base station to their active set when the base stations' $E_c/I_o$ values are greater than T_Add. If the target BS $E_c/I_o$ is greater than T_Add, the method proceeds to a STEP 204. Otherwise, the method returns to the STEP 200. At the STEP 204, the method sends a pilot strength measurement message ("PSMM") to the serving base station in a well-known manner and adds the target base station to the active set of a mobile station.

As shown in FIG. 6b, the method then proceeds to a decision STEP 206 where the method determines whether the serving base station has sent an intergenerational handoff ("IGHO") direction message to the mobile station. One skilled in the art shall recognize that other messages performing similar functions to the IGHO direction message can be utilized at the decision STEP 206 without departing from the scope or spirit of the present method and apparatus. If the serving base station has sent an IGHO direction message to the mobile station, the method proceeds to a STEP 207. Otherwise, the method returns to the STEP 200. At the STEP 207, the method measures the pilot signal strength of the serving and target base stations. The method then proceeds to a decision STEP 208. At the decision STEP 208, the method determines whether the pilot signal strength of the serving base station (BS) is less than or equal to the pilot signal strength of the target BS. If the serving BS $E_c/I_o$ is less than or equal to the target BS $E_c/I_o$, then the method proceeds to a STEP 210. Otherwise, the method returns to the STEP 207. At the STEP 210, the method initiates a reverse link IGHHO.

As described above with reference to FIGS. 6a and 6b, the present inventive handoff initiation method and apparatus determines a handoff initiation time instant based on a pilot signal strength parameter. The above-described method initiates a reverse link intergenerational hard handoff when the pilot signal strength of the serving base station is less than or equal to the pilot signal strength of the target base station. One skilled in the art shall recognize that different parameters can be used in determining a handoff initiation time instant without departing from the scope or spirit of the present method and apparatus. One such alternative embodiment of the present method and apparatus utilizing a different parameter ($E_b/N_t$) is now described.

$E_b/N_t$ Embodiment

The $E_b/N_t$ embodiment of the present method and apparatus determines a handoff initiation time instant based upon the $E_b/N_t$ (the ratio of the average power per bit to total received power spectral density) values of both a serving base station and a target base station. Specifically, the method initiates a reverse link intergenerational hard handoff (IGHHO) when the $E_b/N_t$ of the serving base station equals the sum of the $E_b/N_t$ of the target base station and a calculated offset. The offset is specified in terms of generation modulation efficiency. In one exemplary embodiment, an offset is equal to the difference between a serving base station's $E_b/E_t$ requirements and a target base station's $E_b/E_t$ requirements. In a preferred embodiment, the offset is utilized to achieve a desired frame error rate ("FER") or quality of service ("QoS").

Different generation CDMA systems achieve the same FER or QoS at different $E_b/N_t$ values because certain factors are different between generations of CDMA systems. For example, factors such as modulation schemes, coding gain, rate of forward link power control and coherent/non-coherent demodulation differ between 2G and 3G CDMA systems. An $E_b/E_t$ difference between 2G and 3G CDMA systems as great as 3 dB may occur at a desired 1% FER. Thus, the $E_b/N_t$ embodiment of the disclosed method and apparatus utilizes an offset to determine a handoff initiation time instant. One skilled in the art shall recognize that many methods can be used to calculate the offset based on system parameters such as FER or QoS. In a preferred embodiment, the offset is calculated based on the difference between a serving base station's $E_b/N_t$ requirements and a target base station's $E_b/N_t$ requirements. A graphical example of a 2G/3G CDMA system is now described with reference to FIG. 7.

Figure 7:
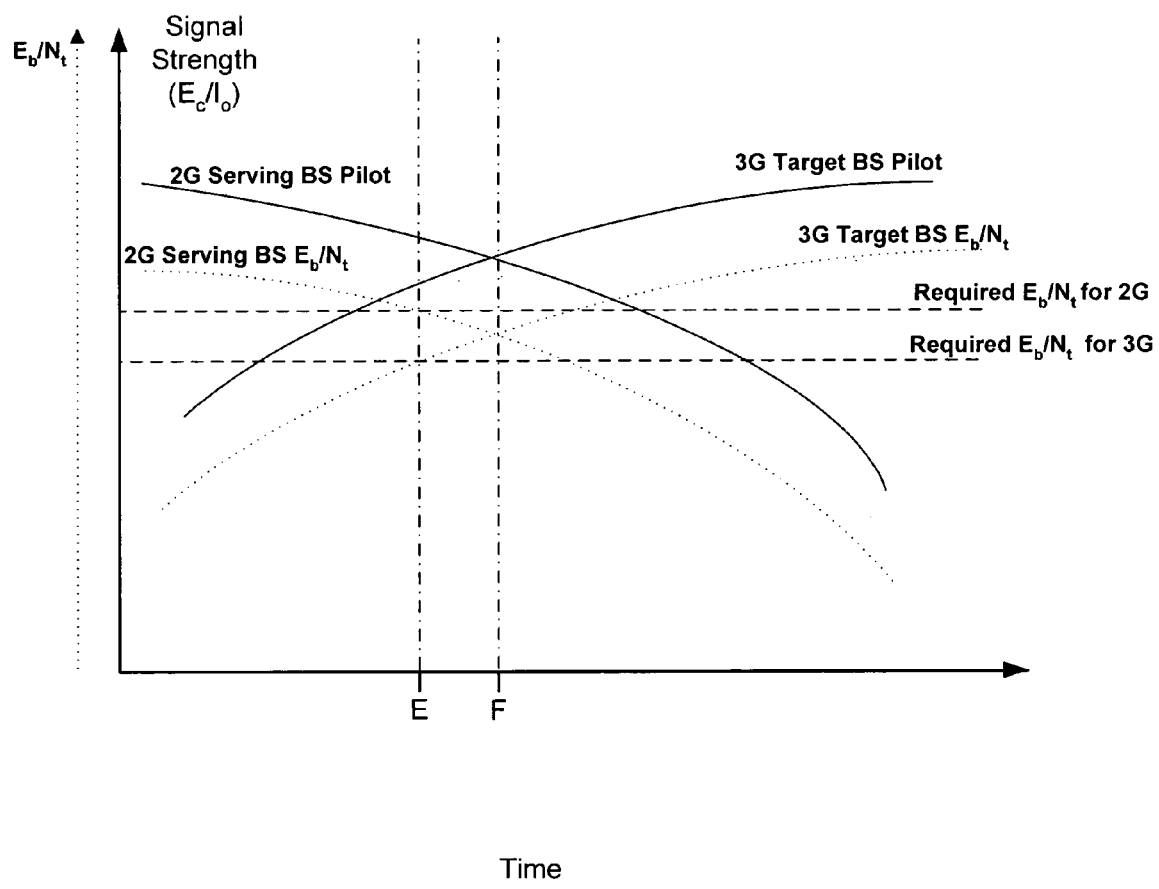
FIG. 7 is a graph depicting pilot signal strengths and $E_b/E_t$ values of a serving base station and a target base station during a handoff.

FIG. 7 is a graph depicting pilot signal strengths and $E_b/E_t$ values of a serving base station and a target base station during a handoff. In the graph of FIG. 7, the serving base station is a 2G base station and the target base station is a 3G base station. The base station generation designations are exemplary only as one skilled in the art shall recognize that the present method and apparatus works equally well with different generational base station configurations.

As shown in FIG. 7, a time reference point F depicts a time instant at which the $E_b/N_t$ values of the serving base station and the target base station are equal. The $E_b/N_t$ embodiment of the present inventive handoff method determines a time reference point F as the time instant to perform handoff initiation when an offset of zero is used. A zero offset can be utilized when the $E_b/N_t$ embodiment does not require a desired system parameter such as FER or QoS. A time reference point E depicts a time instant at which the required $E_b/N_t$ for a 2G base station is achieved for a desired result (e.g., a 1% FER). The time reference point E also depicts a time instant at which the required $E_b/N_t$ for a 3G base station is achieved for a desired result (e.g., a 1% FER). Therefore, in the exemplary 2G/3G CDMA system, an optimal handoff initiation time instant for a desired FER can be achieved at the time reference point E. An exemplary $E_b/N_t$ method is now described in more detail.

Figure 8A:
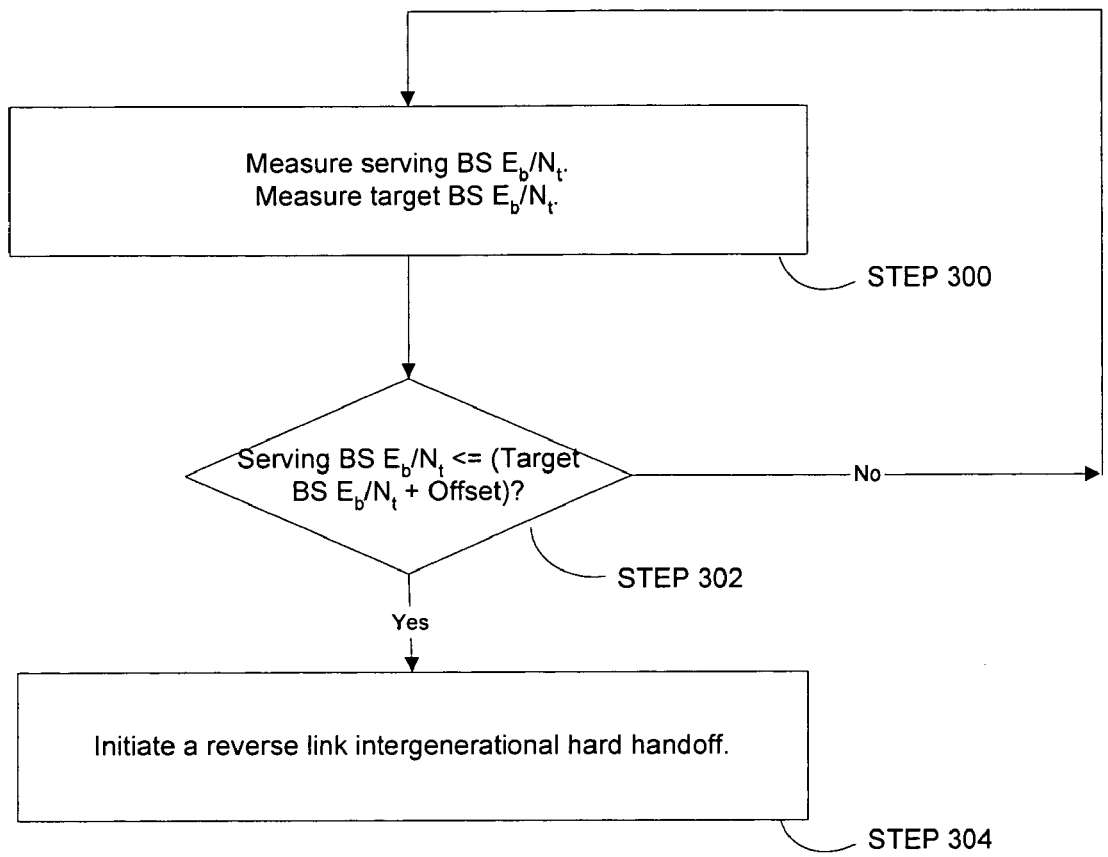
FIG. 8*a* is a logic flowchart of an exemplary $E_b/N_t$ method in accordance with the present disclosure.

FIG. 8a shows a flowchart of an exemplary $E_b/N_t$ handoff initiation method. As shown in FIG. 8a, the exemplary $E_b/N_t$ method begins at a STEP 300 where the method measures the $E_b/N_t$ ratio of the serving and target base stations. The present method and apparatus then proceeds to a decision STEP 302 where the method determines whether the serving BS $E_b/N_t$ is less than or equal to the sum of the target BS $E_b/N_t$ and an offset. As described above, the offset is determined by a desired system specification, such as a desired FER and QoS. In a preferred embodiment, the offset is determined from the difference between a serving base station's $E_b/N_t$ requirements and a target base station's $E_b/N_t$ requirements. If the serving BS $E_b/N_t$ is less than or equal to the target BS $E_b/N_t$, then the method proceeds to a STEP 304, else the method returns to the STEP 300. At the STEP 304, the method initiates a reverse link IGHHO. An exemplary $E_b/N_t$ method adapted for use in a 2G/3G intergenerational CDMA system is now described.

Figure 8B:
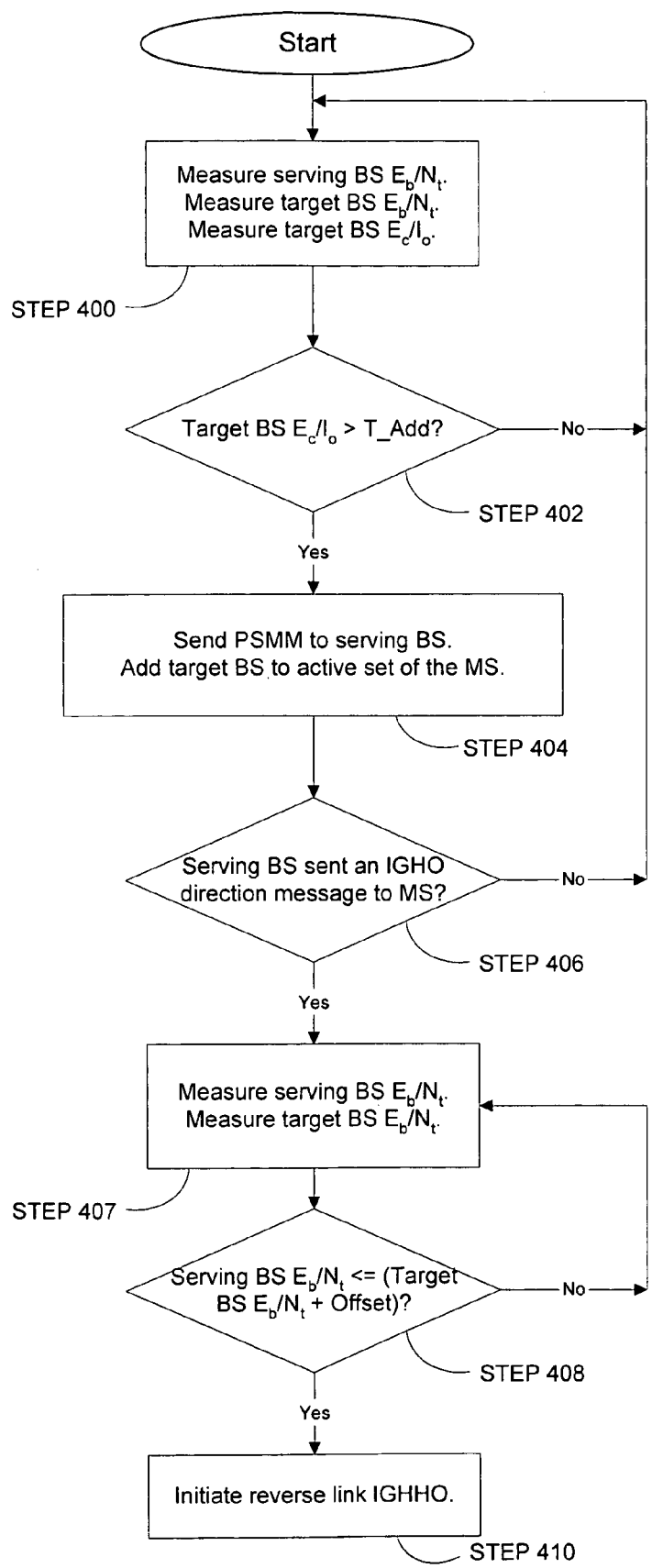
FIG. 8*b* is a logic flowchart of an exemplary $E_b/E_t$ method of the present disclosure adapted for use in a 2G/3G intergenerational CDMA system.

FIG. 8b shows a flowchart of an exemplary $E_b/N_t$ method of the adapted for use in a 2G/3G intergenerational CDMA system. As shown in FIG. 8b, the exemplary 2G/3G $E_b/N_t$ method begins at a STEP 400 where the method measures the $E_b/N_t$ of the serving and target base stations and the $E_c/I_o$ of the target base station. The present method then proceeds to a decision STEP 402 wherein the method determines whether the target BS pilot signal strength is greater than a threshold such as "T_Add". If the target BS $E_c/I_o$ is greater than T_Add, the method proceeds to a STEP 404. Otherwise, the method returns to the STEP 400. At the STEP 404, the method sends a pilot strength measurement message (PSMM) to the serving base station and adds the target base station to the active set of the mobile station.

As shown in FIG. 8b, the method then proceeds to a decision STEP 406 where the method determines whether the serving base station has sent an intergenerational handoff (IGHO) direction message to the mobile station. If the serving base station has sent an IGHO direction message to the mobile station, the method proceeds to a STEP 407. Otherwise, the method returns to the STEP 400. At the STEP 407, the method measures the $E_b/N_t$ of the serving and target base stations. The method then proceeds to a decision STEP 408. At the decision STEP 408, the method determines whether the serving base station (BS) $E_b/N_t$ is less than or equal to the sum of the target BS $E_b/N_t$ and an offset. The offset is determined by a desired system specification desired result or system parameter such as FER and QoS. If the serving BS $E_b/N_t$ is less than or equal to the target BS $E_b/N_t$, the method proceeds to a STEP 410. Otherwise, the method returns to the STEP 407. At the STEP 410, the method initiates a reverse link IGHHO.

As described above with reference to FIGS. 8a and 8b, the present inventive $E_b/N_t$ embodiment determines a handoff initiation time instant based upon an $E_b/N_t$ parameter. The above-described $E_b/N_t$ embodiment initiates a reverse link intergenerational hard handoff when the $E_b/N_t$ of the serving base station is less than or equal to the sum of the $E_b/N_t$ of the target base station and an offset. The offset is based upon a desired parameter or result such as FER and QoS. One skilled in the art shall recognize that different parameters can be used in determining a handoff initiation time instant (and in determining the value of the offset) without departing from the scope or spirit of the disclosed method and apparatus.

In summary, the inventive reverse link intergenerational hard handoff initialization method and apparatus measures and compares parameters between a serving base station of one generation and a target base station of another generation to determine the best possible handoff initiation time instant for performing a reverse link intergenerational hard handoff. Two embodiments of the method and apparatus have been described. The pilot signal strength embodiment of the disclosed method and apparatus determines a handoff initiation time instant based upon the total pilot signal strength of both a serving base station and a target base station. Specifically, the method initiates a reverse link intergenerational hard handoff when the pilot signal strength of the serving base station equals the pilot signal strength of the target base station. The $E_b/N_t$ embodiment of the disclosed method and apparatus determines a handoff initiation time instant based upon the ratio of $E_b/N_t$ (ratio of average power per bit to total received power spectral density) both a serving base station and a target base station. Specifically, the method initiates a reverse link intergenerational hard handoff when the $E_b/N_t$ of the serving base station equals the sum of the $E_b/N_t$ ratio of the target base station plus an offset. The offset is used to achieve a desired system parameter or specific result such as frame error rate (FER) or quality of service (QoS).

The inventive method and apparatus decreases the probability of degrading or dropping a call during an intergenerational handoff. Specifically, the inventive method and apparatus decreases the probability of degrading and dropping calls during a reverse link intergenerational hard handoff. The probability of degraded or dropped calls is achieved without noticeably degrading voice quality or quality of service (QoS).

A number of embodiments of the inventive method and apparatus have been described. Nevertheless, it will be understood that various modifications may be made without departing from the spirit and scope of the disclosed method and apparatus. For example, the disclosed reverse link intergenerational hard handoff initiation method and apparatus can be performed either by utilizing the pilot signal strength or $E_b/N_t$ parameters. In the pilot signal strength embodiment, the inventive method determines a handoff initiation time instant based on the serving and target base station's pilot signal strengths. In the $E_b/N_t$ embodiment, the inventive method determines a handoff initiation time instant based on the serving and target base station's $E_b/N_t$ values and an offset. In another embodiment, the pilot signal strength and $E_b/N_t$ embodiments are both calculated and compared to determine a handoff initiation time instant.

Accordingly, it is to be understood that the disclosed method and apparatus are not to be limited by the specific illustrated embodiment, but only by the scope of the appended claims.

What is claimed is:

1. A method of initiating a reverse link portion of a handoff that has previously been directed between a serving base station and a target base station in a communication system having a plurality of base stations in communication with at least one mobile station, wherein each base station transmits at least one associated and corresponding pilot channel that uniquely identifies the base station, comprising the steps of:
   a) obtaining a first parameter, $E_b/N_t$, associated with the serving base station;
   b) obtaining a second parameter, $E_b/N_t$, associated with the target base station;
   c) determining if the first parameter is less than or equal to a sum of the second parameter and an offset;
   d) returning to step (a) if the first parameter is not less than or equal to the sum of the second parameter and the offset; and
   e) initiating, by the at least one mobile station, the reverse link portion of the previously directed handoff between the serving and target base stations if the first parameter is less than or equal to the sum of the second parameter and the offset, wherein the reverse link portion of the handoff is distinct from a forward link portion of the handoff and wherein both are comprised in a complete handoff, and wherein the reverse link portion of the handoff includes terminating transmissions from the mobile station to the serving base station and initiating transmission from the mobile station to the target base station.

2. The method of initiating a handoff of claim 1, wherein the step (b) further comprises obtaining a target base station $E_c/I_o$ value associated with the target base station.

3. The method of initiating a handoff of claim 2, wherein the step (c) of determining if the first parameter is less than or equal to the sum of the second parameter and an offset comprises the sub-steps of:
   i) determining whether the target base station $E_c/I_o$ value is greater than a threshold parameter T_Add;
   ii) returning to step (a) of claim 1 if the target base station $E_c/I_o$ value is not greater than the T_Add parameter;
   iii) sending a pilot strength measurement message to the serving base station and adding the target base station to an active set if the target base station $E_c/I_o$ value is greater than the T_Add parameter;
   iv) determining whether the serving base station transmitted an intergenerational handoff direction message to the mobile station;
   v) returning to step (a) of claim 1 if the serving base station did not transmit an intergenerational handoff direction message to the mobile station;
   vi) proceeding to step (d) of claim 1 if the serving base station transmitted an intergenerational handoff direction message to the mobile station;
   vii) obtaining the first parameter from the serving base station and the second parameter from the target base station; and
   viii) determining if the first parameter is less than or equal to the sum of the second parameter and the offset.

4. The method of initiating a handoff of claim 1, wherein the offset is based on a Frame Error Rate (FER) parameter.

5. The method of initiating a handoff of claim 1, wherein the offset is based on a Quality of Service (QoS) parameter.

6. The method of initiating a handoff of claim 1, wherein the step (e) of initiating a reverse link handoff is autonomously performed by the mobile station.

7. The method of initiating a handoff of claim 1, wherein the handoff is an intergenerational soft handoff comprising a forward link soft handoff and a reverse link hard handoff.

8. An apparatus for initiating reverse link portions of handoffs that have previously been directed between a serving base station and a target base station in a communication system having a plurality of base stations in communication with at least one mobile station, wherein each base station transmits at least one associated and corresponding pilot channel that uniquely identifies the base station, comprising:
   a) mobile station transmission control facilities configured to send a pilot strength measurement message to the serving base station, and to add the target base station to an active set when a first parameter, $E_c/I_o$, associated with the target base station is greater than a threshold parameter T_Add; and
   b) a mobile station handoff control module configured to initiate a reverse link intergenerational hard handoff as the reverse link portion of a previously directed intergenerational handoff when second parameter, $E_b/N_t$, associated with the serving base station is less than or equal to a sum of a third parameter, $E_b/N_t$, associated with the target base station and an offset,
wherein the reverse link intergenerational hard handoff comprises the reverse link portion, distinct from a forward link portion, of the intergenerational handoff, and includes terminating transmissions from the mobile station to the serving base station and subsequently initiating transmissions from the mobile station to the target base station.

9. The apparatus of claim 8, wherein the offset is a difference between a value of the third parameter, $E_b/N_t$ that is required by the target base station, and a value of the second parameter, $E_b/N_t$ that is required by the serving base station.

10. The apparatus of claim 8, wherein the offset is based on a Frame Error Rate (FER) parameter.

11. The apparatus of claim 10, wherein the FER parameter comprises a 1% FER.

12. The apparatus of claim 8, wherein the offset is based on a Quality of Service (QoS) parameter.

13. The apparatus of claim 8, wherein the reverse link intergenerational hard handoff is autonomously initiated by the mobile station.

14. The apparatus of claim 8, wherein the handoff between the serving and target base stations is an intergenerational soft handoff comprising a forward link soft handoff and a reverse link hard handoff.

15. The apparatus of claim 14, wherein the mobile station is configured to autonomously perform the intergenerational soft handoff.

16. The apparatus of claim 8, wherein the handoff between the serving and target base stations is an intergenerational hard handoff comprising a forward link hard handoff and a reverse link hard handoff.

17. The apparatus of claim 16, wherein the mobile station is configured to autonomously perform the intergenerational soft handoff.

18. The apparatus of claim 8, wherein the mobile station handoff control module is further configured to initiate the handoff in (b) in response to the serving base station, when the serving base station transmits an intergenerational handoff direction message to the mobile station.

19. A method of initiating a handoff between a serving base station and a target base station in a communication system having a plurality of base stations in communication with at least one mobile station, wherein each base station transmits at least one associated and corresponding pilot channel that uniquely identifies the base station, and wherein the serving base station and the target base station operate in accordance to different generations of communication systems, comprising:
   a) monitoring, by the at least one mobile station, a first parameter $E_b/N_t$, reflective of a signal received from the serving base station;
   b) monitoring a second parameter $E_b/N_t$, reflective of a signal received from the target base station;
   c) monitoring a different third parameter $E_c/I_o$, reflective of a signal received from the target base station;
   d) determining whether the third parameter is greater than a predetermined threshold parameter T_Add and returning to step (a) if not, else sending a pilot strength measurement message (PSMM) to the serving base station and adding the target base station to an active set;
   e) determining whether the serving base station transmitted an intergenerational handoff direction message to the mobile station, and returning to step (a) if not, else continuing to step (f);
   f) determining whether the first parameter is less than or equal to a sum of the second parameter and an offset, and returning to step (a) if not, else initiating a reverse link handoff between the serving and target base stations.

20. The method of claim 19, further comprising basing the offset of step (f) on a Frame Error Rate (FER) factor.

* * * * *